United States Patent [19]

Bunyea et al.

[11] 4,243,212

[45] Jan. 6, 1981

[54] MEANS FOR RESTRAINING A SWIVEL VISE

[75] Inventors: Roderick F. Bunyea, Cockeysville; Robert P. Wagster, Greensboro, both of Md.

[73] Assignee: Black and Decker Manufacturing Company, Towson, Md.

[21] Appl. No.: 42,787

[22] Filed: May 29, 1979

[51] Int. Cl.³ .............................................. B23Q 1/04

[52] U.S. Cl. ..................................... 269/75; 269/139; 269/219

[58] Field of Search ............................... 248/181, 276; 81/177 UJ; 269/75, 82-85, 139, 219-220, 229

[56] References Cited

U.S. PATENT DOCUMENTS 3,107,908 10/1963 West ...................................... 269/84

FOREIGN PATENT DOCUMENTS 804788 7/1949 Fed. Rep. of Germany ............ 269/75

206781 8/1939 Switzerland ............................... 269/75

232706 9/1944 Switzerland ............................... 269/75

*Primary Examiner*—Robert C. Watson

*Attorney, Agent, or Firm*—Frank J. Thompson; Edward D. Murphy; Leonard Bloom

[57] ABSTRACT

A vise having jaw gripping members supported by a body having a bowl shaped body member is described. The body member is positioned in a cavity of a base member and a means is provided including a lock body positioned within the bowl member for selectively restraining the support body at a plurality of different orientations.

17 Claims, 17 Drawing Figures

Fig. 5.
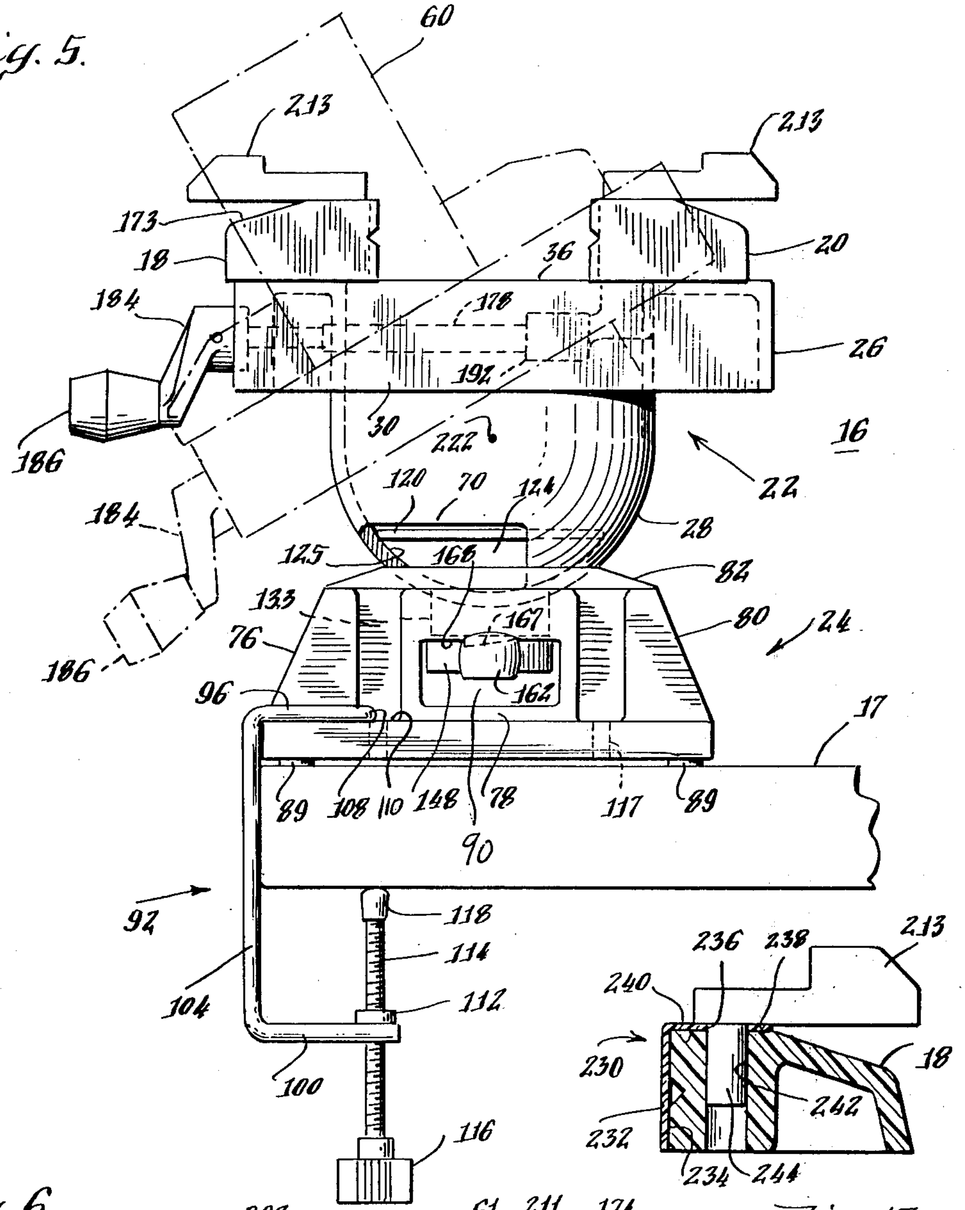
Fig. 17.
Fig. 6.
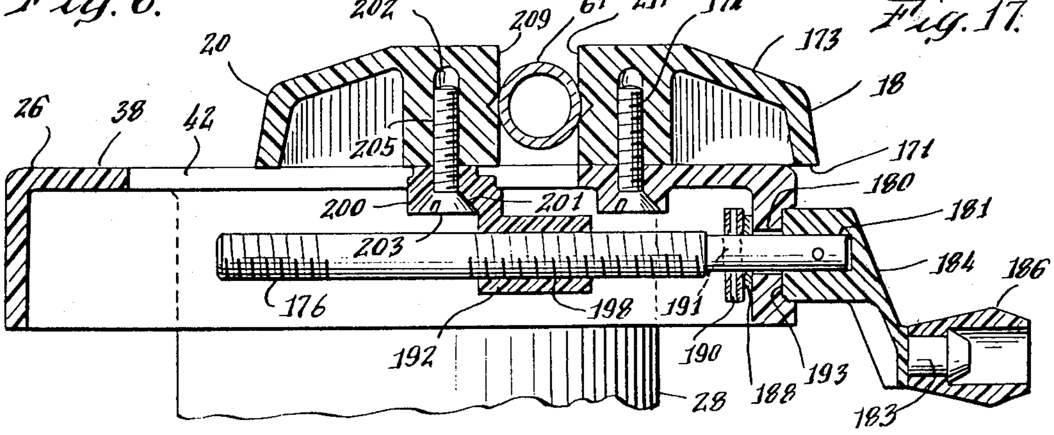

Fig. 7.
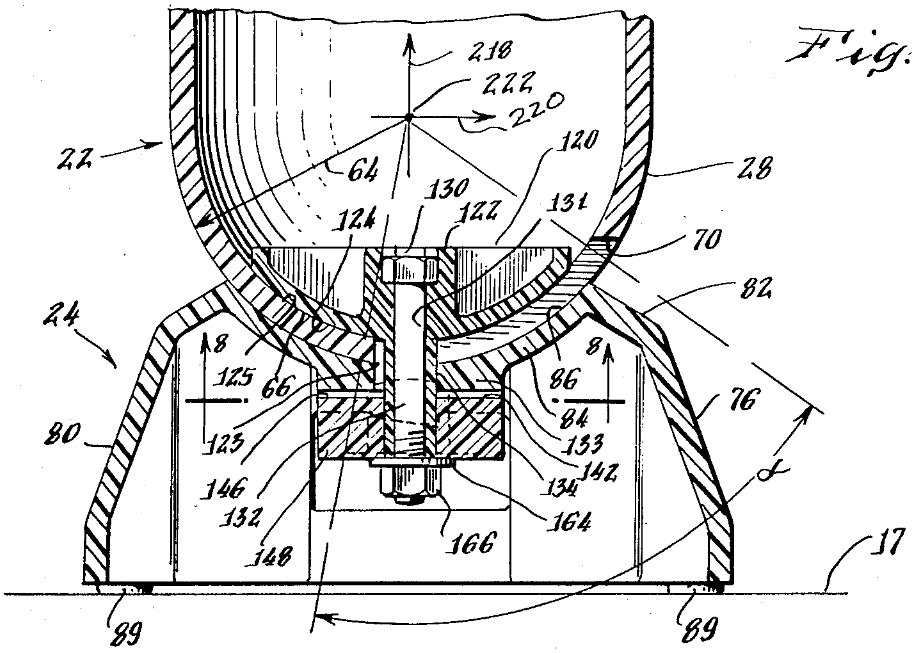
Fig. 8.
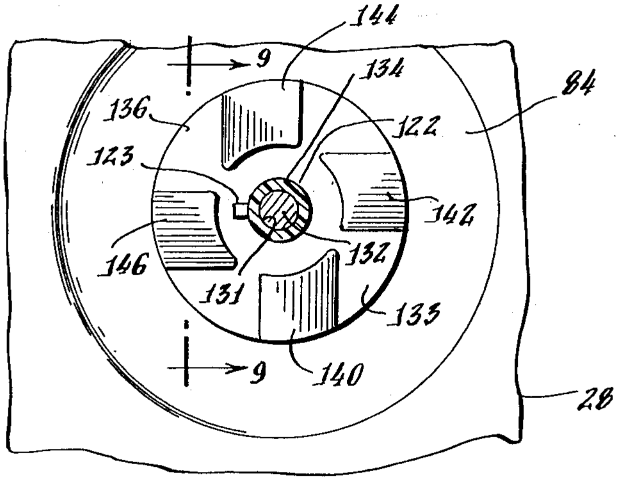
Fig. 9.
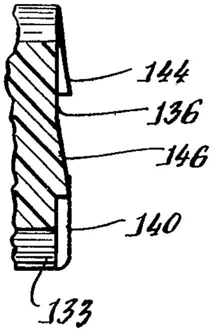
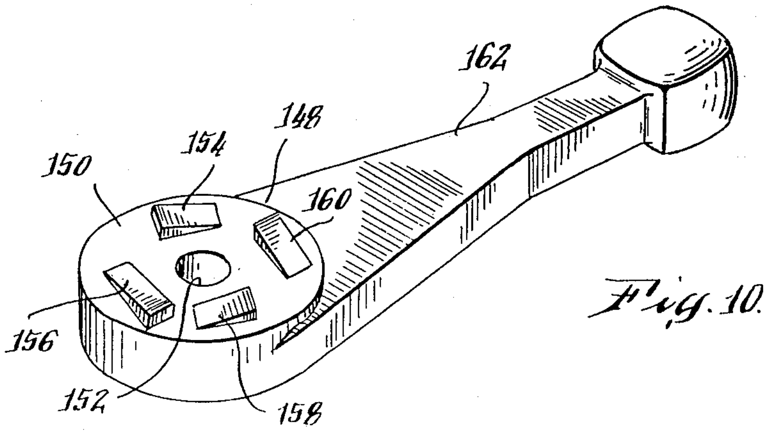
Fig. 10.

MEANS FOR RESTRAINING A SWIVEL VISE

BACKGROUND OF THE INVENTION

1. Field of the Invention

This invention relates generally to apparatus for supporting a workpiece. The invention relates more particularly to an improvement for securing a swivel vise at a desired orientation.

2. Description of the Prior Art

Vises are known which are suitable for relatively moderate to light working operations on a workpiece and for hobby, arts and crafts activities. Such vises generally include means for gripping a workpiece between jaw members. In order to enable presentment of a workpiece at a number of different attitudes during working operations, it is also known to provide a means for swiveling the vise. A ball and socket arrangement is provided which is positioned adjacent a base of the vise and enables the vise to be swiveled or rotated in different directions. While a specific configuration of ball and socket varies from vise to vise, in general, more than half of the ball surface is gripped for providing swiveling restraint. The apparatus is further characterized by a rigid support shaft formed of metal and which supports a jaw member assembly in the swivel means. The physical dimensions of these vises are sufficiently small so as to render the vise portable and enable the vise to be transported from place to place. While portability is imparted to the vise by virtue of its size, nonetheless the vise is fabricated of solid metal to provide rigidity and ruggedness. The vise is thus relatively heavy and costly. In addition, the vise has a substantially limited jaw opening and does not provide desired angularity control between faces of the vise jaws, a feature which is often desirable for various working applications.

An improved form of portable vise for supporting a workpiece during relatively moderate to light working operations, which is of relatively light weight and which can be fabricated relatively economically is described in copending U.S. patent application No. (42,778), filed concurrently herewith and which is assigned to the assignee of this invention. In that arrangement, the vise includes a support body having a bowl shaped body member which is seated in a cavity of a base body. It is desirable to enable swiveling of the bowl shaped member in the cavity and to restrain movement of the bowl member at a preselected orientation. In order to facilitate the orientation, it is also desirable that restraint on the bowl member be applied and released with a single motion by the user.

SUMMARY OF THE INVENTION

Accordingly, it is an object of this invention to provide an improved means for locking a swiveling vise at a preselected orientation.

Another object of the invention is to provide a relatively non-complex and relatively economical arrangement for securing a swivel vise at a preselected orientation.

Another object of the invention is to provide an improved lock means for a swivel vise which is actuated by a single hand motion.

A further object of the invention is to provide an improved means for captivating a bowl shaped member of a portable vise in a cavity of a base body and for inhibiting and enabling motion of the bowl shaped member in the cavity.

Another object of the invention is to provide an improved means for enabling swiveling of a vise about three mutually perpendicular axes.

In accordance with features of this invention, a vise includes first and second workpiece gripping members and a means for supporting the members for providing relative motion therebetween. The support means includes a bowl shaped body member having an interior and a base body having a cavity formed therein and in which the bowl body member is positioned. A means for restraining the bowl body member in the cavity is provided and includes a lock body positioned in the bowl member having a surface configuration which conforms with and engages a surface of the bowl member. A segment of the bowl member is thereby sandwiched between the lock body and the base body. The restraining means further includes a force applying means for selectively applying and releasing a force between the lock and base bodies in order to respectively inhibit and enable sliding motion of the bowl member in the cavity.

In accordance with another feature of the invention, the bowl member includes an aperture formed therein at a location adjacent to the cavity and the lock body includes a segment thereof extending through the aperture. The lock body segment engages a base body aperture which inhibits motion of the lock body during sliding movement of the bowl member in the cavity.

In accordance with more particular features of the invention, the force applying means includes first and second engaging surfaces which are configured and positioned to mutually interfere upon selective movement of a first of the surfaces and to apply restraining force to said lock body upon the interference. In a particular arrangement, the surfaces are cammed. A more specific embodiment comprises an annular array of ramp shaped segments positioned on each of the surfaces. A lever arm is provided and extends from a body on which one of the interfering surfaces is formed. The lever arm extends from the base body and rotation of the lever arm an angular distance in a first direction establishes an interference between the surfaces while rotation in an opposite direction removes the interference.

BRIEF DESCRIPTION OF THE DRAWINGS

These and other objects and features of the invention will become apparent with reference to the following specification and to the drawings wherein:

FIG. 5 is a side elevation view of the vise of FIG. 1 illustrating a frame member of the vise at alternate orientations;

FIG. 6 is a fragmentary view taken along lines 6—6 of FIG. 1;

FIG. 7 is a fragmentary view taken along lines 7—7 of FIG. 1;

FIG. 8 is a fragmentary view taken along lines 8—8 of FIG. 7;

FIG. 9 is a fragmentary view taken along lines 9—9 of FIG. 8;

FIG. 10 is an enlarged perpective view of a locking lever utilized with the vise of FIG. 1;

DETAILED DESCRIPTION

Figure 2:
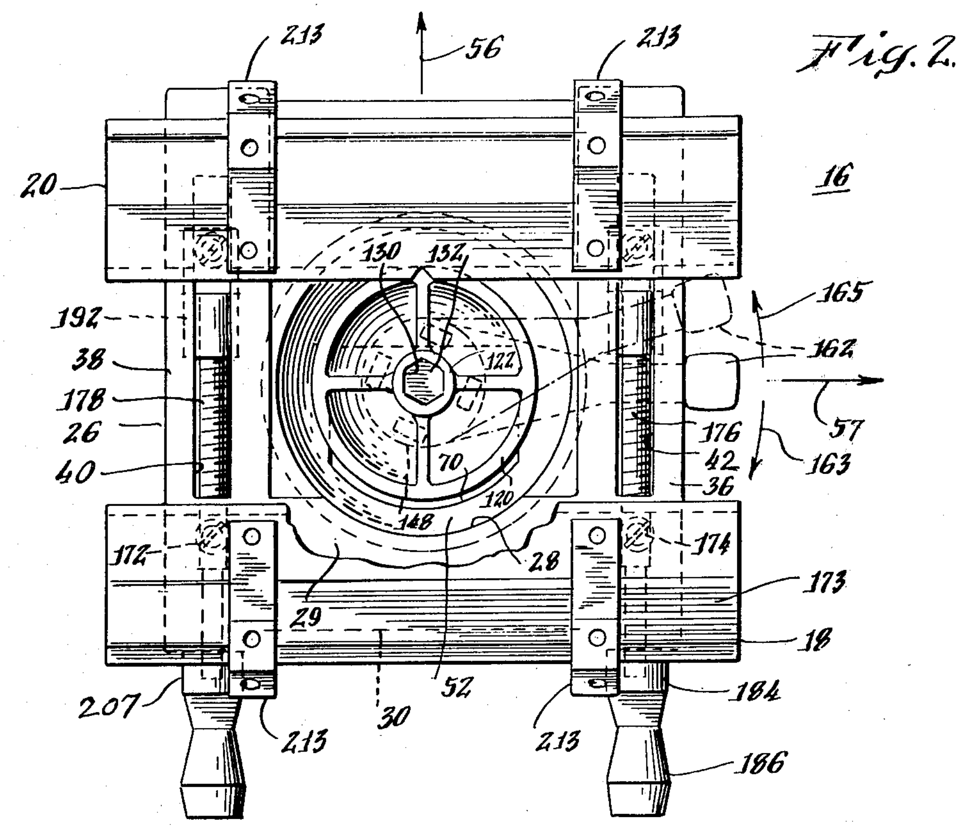
FIG. 2 is a plan view of the vise of FIG. 1.

Referring now to the drawings and particularly to FIGS. 1-4, a vise 16 of the invention is shown supported on a surface 17 of a workbench or a support table. The vise 16 includes first and second workpiece gripping jaw members 18 and 20 and a means for supporting these members. The vise support means comprises a support body 22 and a base body 24. Support body 22 comprises an integrally formed frame member 26 and an integrally formed bowl shaped member 28. The jaw members 18 and 20, the support body 22 and the base body 24 are fabricated of a relatively lightweight economical material. One such material is a polymer plastic. A preferable material is a structural foam polymer plastic.

The frame member 26 includes a surface segment 29, a peripheral skirt segment 30 and has a length 31 and a width 32. The surface segment 29 includes parallel aligned segments 36 and 38 each having elongated slots 40 and 42 formed therein. An aperture 52 (FIG. 2) is provided in the surface and extends in the direction of a plane defined by the mutually perpendicular axes 56 and 57 (FIG. 2). The first jaw member 18 is stationary and is mounted to the surfaces 36 and 38 as indicated in more detail hereinafter. The second jaw member 20 extends between the surfaces 36 and 38, and, as indicated hereinafter, is advanced toward and retracted from the stationary member 18 for respectively gripping and releasing a workpiece 60 as shown in FIG. 5 or a workpiece 61 as shown in FIG. 6.

The bowl member 28 communicates with the aperture 52 of the frame member. The bowl member 28 which has a longitudinal axis 62 extends from the aperture 52 of the frame member in the direction of its longitudinal axis. The bowl member 28 includes a curved spherical segment 64 (FIG. 4) shown to be a thin walled hollow hemisphere and having a curved surface segment 66 located at a bottom section 67 of the member. The bowl member 28 has a depth extending in the direction of its longitudinal axis 62 which enables extension of an elongated workpiece into an interior of the member. The bowl member can comprise a hollow hemispherical body or it includes an extension segment such as the integral cylindrical segment 69 (FIG. 4) which is positioned between the spherical segment 64 and the aperture 52. A cut-out 70 is formed in the spherical segment through which a component of a restraining means extends, as is indicated in greater detail hereinafter.

The base body 24 includes a plurality of upstanding wall segments 74, 76, 78 (FIG. 1) and 80 (FIG. 7) which provide an elevated platform surface 82 in which a depending cavity 84 is formed. The cavity 84 includes a curved surface 86 (FIG. 7) which conforms with the curvature of the surface 66 of the bowl segment 64. Cavity 84 is thus adapted to receive and seat the bowl member 28 for sliding engagement between the bowl and base body surfaces. A plurality of feet 89 are mounted to the bottom surface for spacing the base body from the table surface 17. These feet made of a polymer for example provide against movement and slippage of the vise and avoid scratching of a finished surface 17.

A restraining means is provided for captivating the bowl member 28 in the cavity 84 and for alternatively enabling sliding movement between the surfaces 66 and 86 or maintaining the bowl member 28 at a preselected orientation. The restraining means includes a lock body 120 (FIG. 7) shaped as a spherical segment which is positioned in the bowl member 28. A spherically curved surface 124 conforms in surface configuration with a spherically curved surface 125 of the interior of the bowl 28. Body 120 includes a hub segment 122 and a key shaped boss 123 extending axially from the hub segment 122 through the cutout 70 and into the base body 24. A hexagonal shaped aperture 130 is formed in the hub segment 22 and a cylindrical shaped bore 131 of reduced diameter is formed in the hub and in the boss 123. A rod 132, having a hexagonal head engages the hexagonal aperture 130 and rotation thereof is inhibited.

The restraining means further includes a cylindrically shaped body hub 133 integrally formed on the base body and through which a key shaped aperture 134 extends. The key shaped boss 123 of body 120 engages aperture 134 and inhibits rotary movement of the body 120. An annular array of raised ramp shaped segments 140, 142, 144 and 146 are integrally formed on a surface 136 of hub 133.

Figure 12:
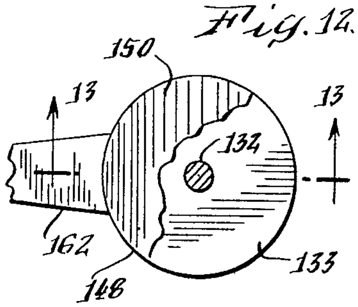
FIG. 12 is a bottom view of an alternative embodiment of a locking means of the invention.
Figure 3:
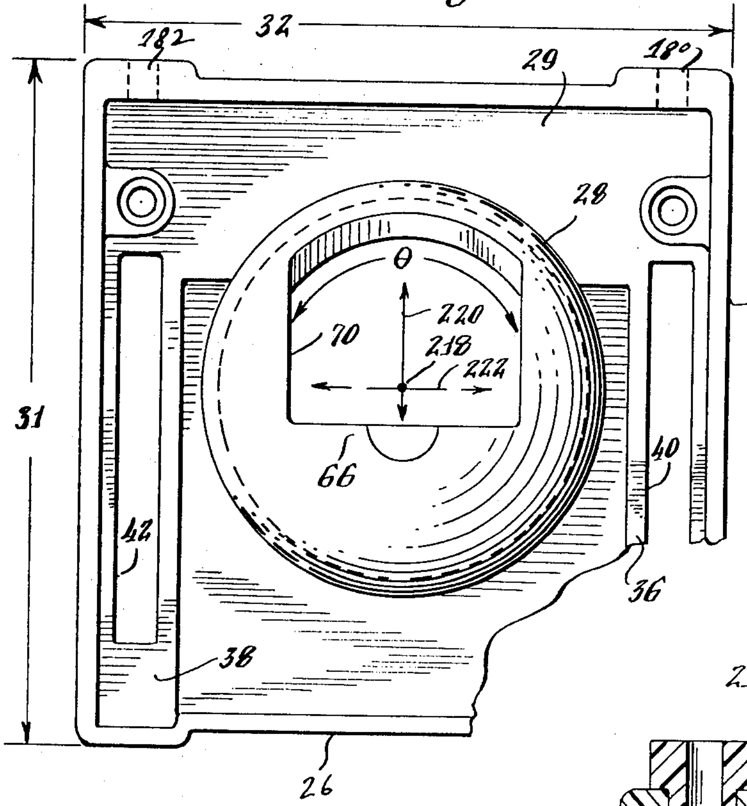
FIG. 3 is a fragmentary bottom view of a support body of FIG. 1.
Figure 13:
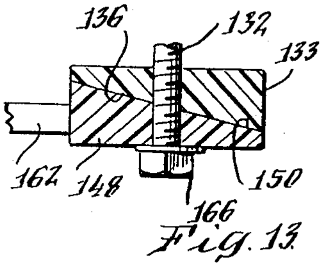
FIG. 13 is a view along line 13—13 of FIG. 12 illustrating non-interfering engagement between surfaces.
Figure 14:
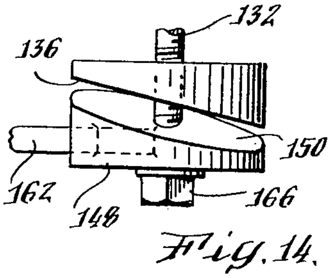
FIG. 14 is a side elevation view of the locking means of FIG. 12 illustrating an interference between surfaces.
Figure 16:
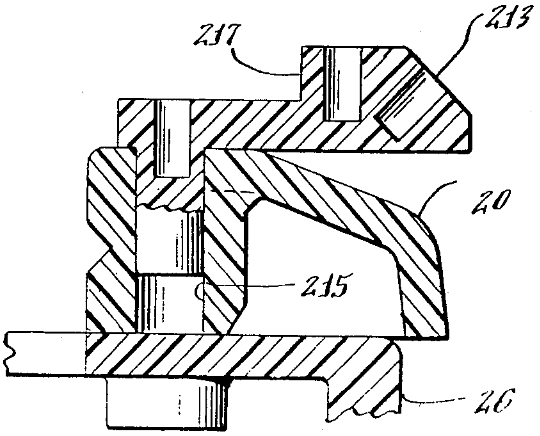
FIG. 16 is an enlarged fragmentary view in section of a swivel mounting arrangement; and, FIG. 17 is a fragmentary view of a jaw member illustrating the mounting of a jaw member clad body.

A locking lever 148 is provided having a surface 150, an aperture 152 formed therein, and an annular array of ramp shaped segments 154,156,158 and 160 which are integrally formed with the lever 148 and extend from the surface 150. The ramp segments are arrayed for providing that each ramp segment increases in height in a predetermined direction as, for example, in a counterclockwise direction as shown in FIG. 10. The lever 148 is maintained in engagement with the surface 136 of the base body hub 133 by the screw 132 which extends through the aperture 152 in the lever arm 148, a washer 164 and a locking nut 166. The lock lever 148 includes a lever arm segment 162 which extends through the aperture 90 formed in the base body wall. As shown in FIG. 5, this aperture includes a ratchet shaped segment 167 extending to a notch 168. Upon rotation of the lever arm 162 in a first direction 165 (FIG. 2), the ramp segments 140,142,144 and 146 are forced into engagement with the corresponding ramp segments 154,156,158 and 160, thereby forcing the screw 132 to advance in an axial direction toward the base body 24. The effect of movement is determined by the relative positioning of ramp segments 140-146 and 154-160. As shown, the lever arm is advanced about 30° to 60° to establish interference. The captivating spherical body 120 then exerts a force on the spherical segment 64 which is positioned between this body and the cavity surface 86. Movement of the bowl member 28 and support body is inhibited and it is maintained at a preselected orientation. By rotating the lever arm segment 162 in a second opposite direction 163 (FIG. 2), the ramp segments are disengaged, the sandwiching force established by the spherical body 120 on the bowl member 28 is released and the bowl member, although captivated in the cavity, can be reorientated by the application of hand pressure. Upon reorientation, the bowl member 28 can then be locked in the selected position by advancing the lever arm in the opposite direction 165. A tool 169 (FIG. 11), such as a wrench, may be extended through the aperture 90 for adjusting nut 166 to compensate for wear. FIGS. 12, 13 and 14 illustrate an alternative cammed surface configuration wherein surfaces 136 and 150 are cammed or annularly tapered to provide interference therebetween. FIG. 13 illustrates non-interfering engagement while FIG. 14 illustrates the lever 148 rotated for establishing interference.

Figure 1:
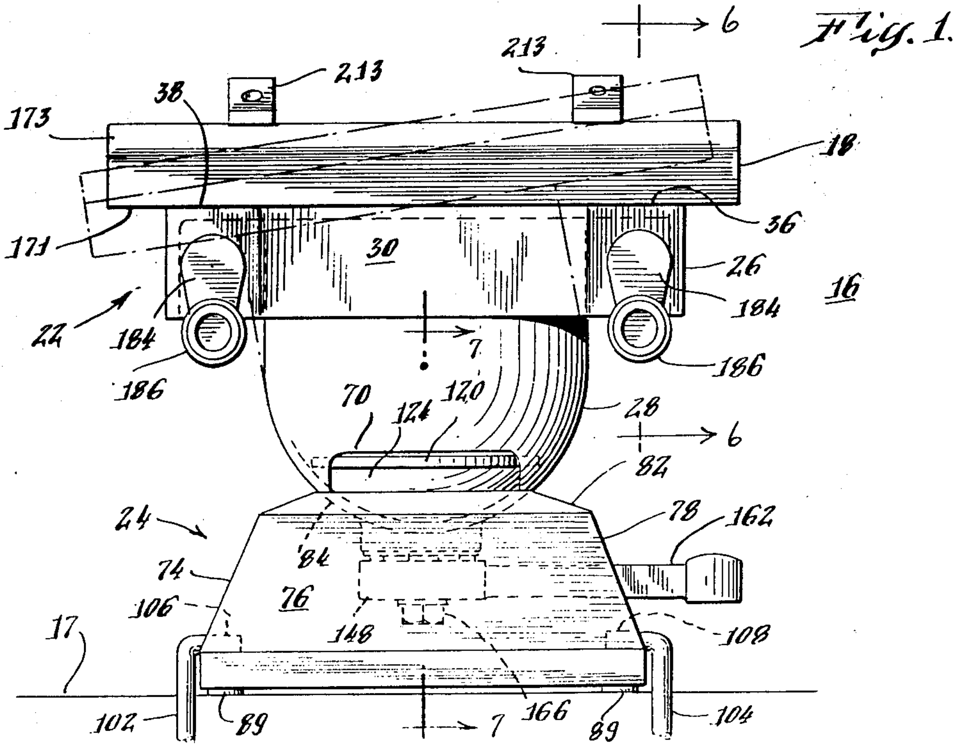
FIG. 1 is a front elevation view of a vise constructed in accordance with the features of this invention.
Figure 4:
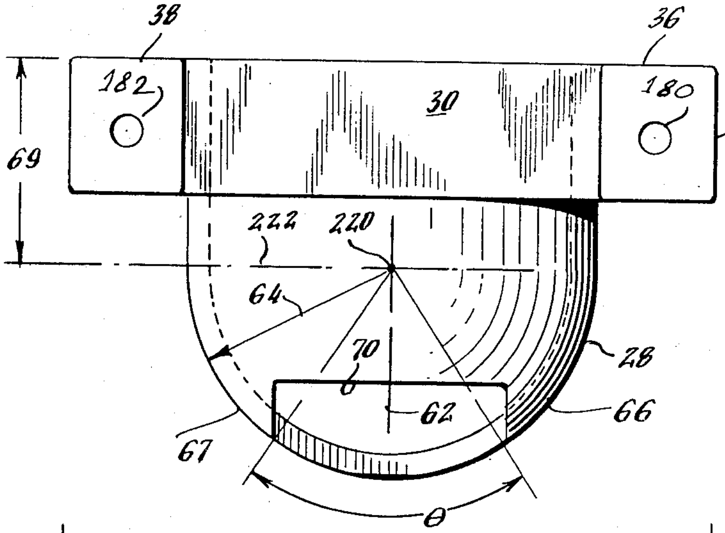
FIG. 4 is a side elevation view of the support body of FIG. 3.
Figure 11:
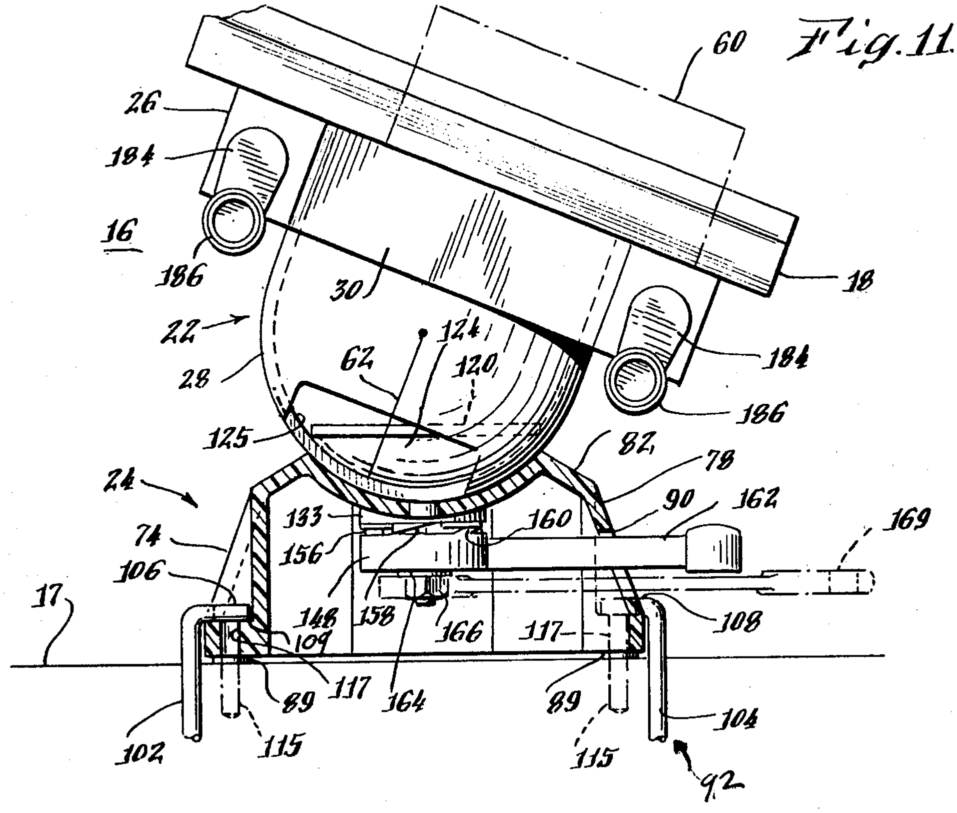
FIG. 11 is a view of the vise of FIG. 1 in a preselected orientation and partly broken away to illustrate a restraining means.

The bowl member 28 is advantageously adjustable in the cavity and has substantial freedom of movement in order to present the workpiece at a desired attitude. The extent of reorientation and movement of the bowl member 28 in the cavity about three axes is determined by the size and configuration of the cutout 70. The cutout 70 is configured and sized to provide on the one hand a substantial degree of unlimited movement, and, on the other hand, to provide a bowl surface segment 66 having an area sufficiently large to assure mechanical integrity of the bowl in supporting the bowl member and for enabling restraint of the same upon the application of a sandwiching force by the spherical body 120. The restraining arrangement is advantageous in that the spherical configuration of the body 120 applies a restraining force across a gap of the cutout and contributes to the rigidity of the bowl member in the area of the cutout. The cutout 70 is at least coextensive with the axis 218 (FIG. 7) thereby enabling the bowl member 28 to rotate 360° about this axis. The cutout is formed for providing that the bowl member may be rotated an angular distance ($\alpha$) about an axis 222 (FIG. 7). Since the bowl member 28 can be rotated 360° about an axis 218, the angular rotation ($\alpha$) is effectively doubled. Orientation about the axis 222 is shown in FIG. 5. The cutout is also shaped to enable rotation for an angular distance ($\theta$) (FIG. 4) about axis 220. Various orientations about the axis 220 are illustrated in FIGS. 1 and 11. Thus, a substantial degree of freedom is provided for reorientating the support body 22 to a desired attitude. The size and configurations of the cutout can be varied to suit particular needs. It has been found that the angles ($\alpha$) and ($\theta$) can equal 40° and 20° respectively while providing sufficient structural integrity for a hemispherical segment 64 formed of a structural polymer foam having a radius of 51 mm and a wall thickness of 5 mm.

Figure 15:
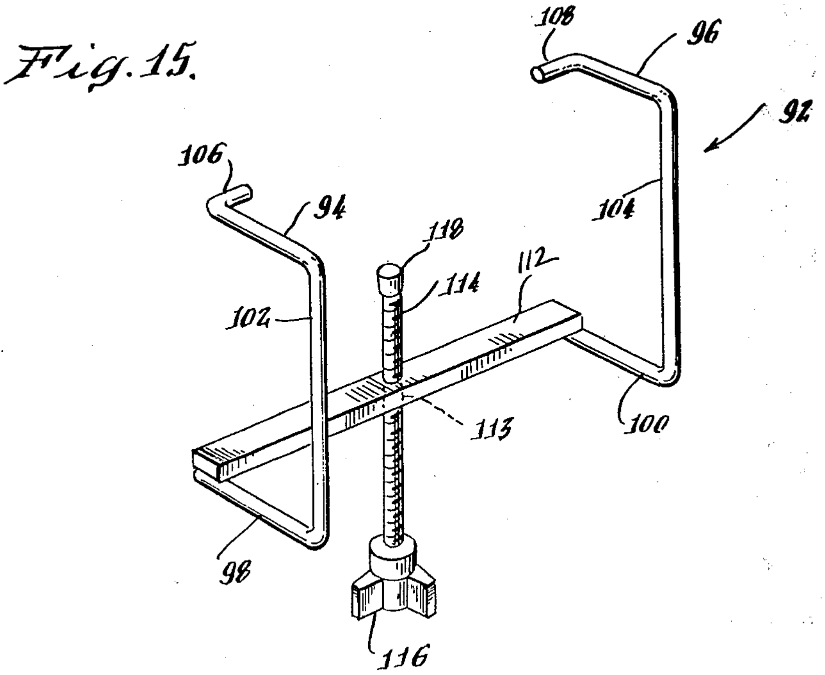
FIG. 15 is an enlarged perspective view of a means for mounting the vise of FIG. 1 to a support surface.

A quick connect and disconnect mounting means comprises a clamp 92 (FIGS. 5, 11 and 15) which is provided for mounting and demounting the base body 24 to the surface 17 of a worktable or bench top. The clamp 92 comprises a formed wire body having horizontal segments 94 and 96 which extend over an upper surface of the work support table, horizontal segments 98 and 100 which extend below a lower surface of the worktable, vertical segments 102 and 104, and segments 106 and 108 for engaging surfaces 109 and 110 in the base body 24. A plate 112 is provided and extends between the lower horizontal segments 98 and 100. An aperture 113 is formed in the plate and a screw 114 engages and extends through the aperture. The screw 114 includes a knob 116 and a tip 118 mounted at opposite ends of the screw for respectively rotating the screw and for engaging the lower section of the worktable. Alternatively, the vise 16 can be screw mounted to a table by screws 115 extending through apertures 117 in the segments 106 and 108 or it can be utilized freestanding without use of any mounting members.

The first gripping member 18 comprises an elongated stationary member having a lower, flat surface 171 engaging support surfaces 36 and 38 (FIGS. 1, 2) and an upper beveled surface 173. This member is mounted to the frame by screws 172 and 174. The second jaw member 20 is transported by means including first and second, elongated, rotatably mounted screws 176 and 178. Apertures 180 and 182 (FIG. 3) formed in the frame member 26 provide for support of the screws at one end thereof. The arrangement of the screw support and jaw member transport is similar for each of the screws 176 and 178. The following description, which is applicable to the screw 176, is equally applicable to screw 178 and similar components are provided for supporting the screw 178. A distal segment of the screw 176 extends through the aperture 180 (FIG. 6) and engages a bore 181 of a crank arm 184. A rotatable knob 186 is pressed on and captivated by a lever segment 183 of the crank arm. A plate or washer 188 is positioned on the screw adjacent a wall segment of the frame member and a pin 190 extends through a transverse bore 191 in the screw for inhibiting longitudinal movement of the screw through the aperture. The pin and washer as well as a surface 193 on the crank arm inhibits movement of the screw 176 in an axial direction. The screw 176 is supported at another location along its length and is mechanically coupled to the transported jaw 20 by a travel body or pivot nut 192. The body 192 includes an internally threaded bore 198 which is engaged by the screw 176. A shoulder 200 is formed on the body 192 and an aperture 201 is formed therein. A screw 202 extends through this aperture and engages the gripping member 20 in a bore 205. The screw 202 while engaging the gripping member 20 includes a flat head segment 203 which is freely rotatable in the aperture 201. Upon manual rotation of the crank arm 184, the screw 176 rotates causing movement of the travel body 192 in an axial direction in accordance with the direction of the rotation of the crank. Screw 202 extends through the elongated slot 42 formed in the frame member 26 surface 38 and causes jaw member 20 to travel therewith. As indicated, a similar support arrangement is provided near an opposite end of the member 20. By rotating cranks 184 and crank 207, the jaw member 20 is advanced and retracted relative to the stationary member 18 with jaw faces 209 and 211 (FIG. 6) thereof parallel. By rotating only a single crank or by rotating the crank at different rates, the jaw faces 209 and 211 are positioned anti-parallel. This is advantageous in that tapered and wedge shaped workpieces can be conveniently gripped by the jaw faces. A workbench which exhibits the angularity control is disclosed in U.S. Pat. Nos. 3,615,087, 3,841,619 and 4,076,229 to Arnold Hickman which are assigned to the assignee of this invention.

In addition to gripping a workpiece directly with the jaw faces, the workpiece can be gripped through the use of swivel members 213 which are rotatably positioned in apertures 215 (FIG. 13) formed in a jaw member. A swivel includes a ridge 217 and swivels on opposite jaws are employed to support a workpiece which is positioned in the ridges 217. The jaws 18 and 20 are spaced apart a substantial distance in the described arrangement by advancement of the transportable member 20 along the frame member surface. This spacing is further increased through the use of the swivels 213.

At times, relatively hard workpiece materials, such as metals, are gripped which can deform relatively soft faces of the jaw members. On other occasions, the jaw members will grip relatively softer materials. In order to accommodate these different materials without deformation of the jaw faces or workpiece, an elongated, angle shaped jaw face cladding member 230 (FIG. 17) is provided and is supported on a jaw member 18. The clad member 230 includes a segment 232 which extends parallel to and adjacent a gripping jaw member face 234. The clad member 230 includes an aperture 236 formed in another integral angle segment 238 which extends along a surface 240 of the jaw. Aperture 236 is located adjacent a swivel receiving cavity 242 and the segment 238 is sandwiched between the swivel member 213 and the jaw member 18. An integral stud 244 of swivel member 213 extends through the aperture in 236 in the clad member 230 and into the cavity 242 formed in jaw member 18 thereby mounting the clad member 230 at a fixed location along the jaw member. A second similar aperture, not shown, is formed along the segment 238 for alignment with a second swivel receiving cavity in the jaw member. A second clad member, not shown, is provided and is similarly mounted to the other jaw member 20. The clad member 230 is formed of metal, polymer plastic, fiber or other suitable gripping material. This mounting of the clad member 230 is advantageous in that the clad members are mounted to the jaw members without the need for additional mounting members.

An improved swivel vise has thus been described having means for captivating and selectively restraining and enabling movement of a bowl shaped body member in a cavity of a base body. The restraining means which includes a lock body positioned in the bowl shaped member is advantageous in that it is relatively non-complex and is economical to fabricate, enables rotation about three mutually perpendicular axes and provides for inhibiting and enabling movement of the bowl member in the cavity with a single-motion, manually-actuated locking means.

While there has been described a particular embodiment of the invention, it will be apparent to those skilled in the art that variations may be made thereto without departing from the spirit of the invention or the scope of the appended claims.

What is claimed is:

1. An improved vise comprising:

a. first and second workpiece gripping members;

b. means supporting said members for relative movement therebetween in a plane for gripping a workpiece;

c. said support means including a hollow, bowl shaped body member formed of a polymer plastic and having a lower section thereof;

d. said bowl member having three mutually perpendicular axes of rotation;

e. said lower section having a spherically curved wall segment and an aperture formed in said wall segment;

f. a base support body formed of a polymer plastic and having a cavity formed therein;

g. said cavity having a surface configuration which conforms in part with said spherical wall segment;

h. said spherical wall segment positioned in said cavity in sliding engagement with said cavity surface for enabling sliding motion and rotation of said bowl body in said cavity about each of said axes;

i. said bowl body having an interior thereof which is unobstructed between a location at said gripping member plane and an interior wall surface of said body located adjacent said cavity;

j. means for restraining said bowl body and said cavity at a preselected orientation about said axes;

k. said restraining means including a lock body positioned within said bowl interior at a location adjacent said cavity in sliding engagement with said interior wall surface;

l. said lock body having a spherically shaped segment conforming with said interior wall surface; and, m. means for selectively applying and releasing a force between said lock body and said cavity surface for respectively inhibiting and enabling sliding motion of said bowl surface in said cavity about said axes.

2. The vise of claim 1 wherein said force applying means includes an elongated rod shaped body coupled to said lock body and extending through said aperture into said base body, and said force applying means applies a force between said rod shaped body and said cavity surface.

3. An improved vise comprising:

a. first and second workpiece gripping members;

b. means for supporting said members for relative motion therebetween in a plane for gripping a workpiece;

c. said support means including first and second rotatably actuated screw members engaging said gripping members for imparting linear motion thereto;

d. said support means including a hollow, bowl shaped body member formed of a polymer plastic and having a lower section thereof;

e. said bowl member having three mutually perpendicular axes of rotation;

f. a base support body having a cavity formed therein;

g. said bowl body lower section positioned in said cavity for sliding engagement with a surface of said cavity and rotation of said bowl body about said axes;

h. said bowl body having an interior thereof;

i. a lock body having a surface configuration conforming with an interior wall surface and positioned within said bowl interior at a location adjacent said cavity for sandwiching a wall segment of said bowl body between a surface of said lock body and said cavity surface;

j. means for selectively applying and releasing a force between said lock body and said cavity surfaces for respectively inhibiting and enabling sliding motion of said bowl body in said cavity about each of said axes;

k. said force applying means including a base support body surface and a rotatable lever body having a surface thereof;

l. said lever body and support body surfaces each having an array of ramp shaped segments which provide non-interfering engagement therebetween at a first relative position of the ramp segments and interfering engagement therebetween at a second relative position of said ramp segments; and, m. means for mechanically coupling said lever body and said lock body upon interference between said ramp segments for establishing a restraining force on said bowl shaped member.

4. The vise of claim 3 wherein said lock body includes an aperture formed therein, said base body includes a centrally located integrally formed hub segment having a bore, said base body surface comprises a surface of said hub segment, said lever body includes a bore extending therethrough, said lever body aperture, said hub body bore and said lock body aperture are positioned in axial alignment, said hub and lever body surfaces are positioned adjacent, said bowl body includes an aperture formed in said lower section and said coupling means comprises a rod shaped body extending through said apertures and means for mechanically coupling said rod shaped body to said lever body and to said lock body.

5. The vise of claim 4 including a lever arm coupled to said lever body and extending from said base body for causing rotation of said lever body upon the application of a manual rotational force to said lever.

6. The vise of claim 5 wherein said lever body is rotatable about said rod body, said lever arm extends from a peripheral surface of said lever body, and said lever arm is operable by the application of a manual rotational force thereto for locking said bowl body member at a preselected orientation.

7. The vise of claim 6 including an aperture formed in said base body and said lever arm extends through said aperture.

8. The vise of claim 7 wherein said base body includes an aperture having a configuration for restraining movement of said lever arm.

9. The vise of claim 5 wherein said lever arm and said lever body are integrally formed.

10. An improved vise comprising:

a. first and second workpiece gripping members;

b. means for supporting said members for relative motion therebetween in a plane for gripping a workpiece;

c. first and second rotatably actuated, spaced apart screw members engaging said first and second gripping members for imparting linear motion thereto;

d. said support means including a hollow, bowl shaped body member formed of a polymeric plastic and having a lower section thereof including an aperture formed therein;

e. said bowl member having three mutually perpendicular axes of rotation;

f. a base support body formed of a polymeric plastic and having a cavity formed therein;

g. said cavity having a surface configuration conforming in part with a surface of said lower section;

h. said bowl member positioned in said cavity in sliding engagement therewith for enabling rotation of said bowl body about each of said axes;

i. a lock body having a surface configuration conforming with a surface configuration of the interior of said bowl body in said lower section;

j. said lock body positioned in sliding engagement with an interior surface of said bowl body at a location for sandwiching a wall segment of said bowl body between said lock body and said cavity surface;

k. said bowl body having an interior thereof which is unobstructed between a location at said gripping member plane and said lock body;

l. means for selectively applying and releasing a force between said lock body and said cavity surface for respectively inhibiting and enabling sliding motion of said bowl body surface in said cavity about said axes; and, m. means for inhibiting movement of said lock body upon movement of said bowl body member about an axis thereof.

11. The vise of claim 10 wherein said means for inhibiting movement of said lock body includes a bore formed in said base body, and a lock body segment extending through said bowl body aperture and engaging said base body bore.

12. The vise of claim 10 wherein said lock body has a longitudinal axis and means for inhibiting rotary movement of said lock body about said axis.

13. The vise of claim 12 wherein said means for inhibiting rotary movement of said lock body comprises a key which is formed in said lock body and extends through said bowl body aperture, a keyway formed in said base body for engaging said lock body key thereby inhibiting rotation of said lock body.

14. The vise of claim 13 wherein said lock body includes a centrally located hub and said key comprises a boss integrally formed with said lock body and extending axially from said hub.

15. The vise of claim 4 wherein said lock body includes a hub, said hub includes an axially extending aperture and said rod extends therethrough.

16. The vise of claim 2 wherein said aperture formed in said bowl shaped member extends for an arcuate distance ($\alpha$) about a first axis of said member and for an arcuate distance ($\theta$) about a second axis.

17. The vise of claim 16 wherein said aperture formed in said bowl shaped member comprises a slot configured and positioned for enabling a swiveling motion of said bowl shaped member in said cavity.

* * * * *